Patented Dec. 11, 1934

1,984,096

UNITED STATES PATENT OFFICE 1,984,096

MIXED CHROMIFEROUS AZO-DYESTUFFS AND PROCESS OF MAKING SAME

Fritz Straub, Basel, and Hermann Schneider, Riehen, near Basel, Switzerland, assignors to firm Society of Chemical Industry in Basle, Basel, Switzerland No Drawing. Application November 6, 1933, Serial No. 696,916. In Switzerland November 7, 1932

10 Claims. (Cl. 260—12)

This invention relates to the manufacture of new mixed chromiferous azo-dyestuffs by causing chromiferous azo-dyestuffs to react in alkaline medium on azo-dyestuffs containing metal binding groups and different from the azo-dyestuffs used for producing the parent chromiferous azo-dyestuffs.

The chromiferous azo-dyestuffs used as parent materials in this invention may be made by various known methods and with various chroming agents from azo-dyestuffs which contain lake-forming groups, such as, for example, the ortho-hydroxyazo-dyestuffs or the ortho-carboxyazo-dyestuffs; for example, they may be made by chroming the dyestuff with an agent yielding chromium in acid, neutral or alkaline medium at ordinary or raised pressure and in presence or absence of suitable additions, such as inorganic or organic acids, or their soluble salts or other substances, for instance organic solvents.

The medium in which the chromiferous azo-dyestuff is to react on the azo-dyestuff which contains the metal binding group may be any one of various substances of alkaline action, for example sodium carbonate, potassium carbonate, borax, magnesium oxide, calcium hydroxide, ammonia, a trialkali-metal-phosphate, a caustic alkali, such as potassium or sodium hydroxide, alone or mixed with one another. Particularly good results in respect of the dyeing properties of the product are obtained when the medium in question contains caustic alkali.

The reaction between the chromiferous azo-dyestuff and the dyestuff containing the metal binding group may occur under various conditions, for example under atmospheric pressure or raised pressure, and in presence or absence of a suitable addition, such as a soluble inorganic or organic salt, or another substance, such as an organic solvent.

Further, according to the invention, not only may a chromiferous azo-dyestuff be caused to act on an azo-dyestuff containing a metal binding group in alkaline medium but several chromiferous azo-dyestuffs and also several azo-dyestuffs containing a metal binding group may be present in the mixture undergoing reaction. The proportion between the chromiferous azo-dyestuff and the azo-dyestuff containing the metal binding group may vary within wide limits.

The invention makes it possible to produce from a soluble chromiferous azo-dyestuff and an insoluble or sparingly soluble azo-dyestuff containing a metal binding group, or from an insoluble or sparingly soluble chromiferous azo-dyestuff and a soluble azo-dyestuff containing a metal binding group, a soluble mixed chromiferous azo-dyestuff; furthermore, there may be made mixed chromiferous azo-dyestuffs from sparingly soluble or insoluble azo-dyestuffs and sparingly soluble or insoluble chromiferous azo-dyestuffs, that is to say the mixed chromiferous azo-dyestuffs which cannot be made or cannot unobjectionably be made in acid or neutral medium. The chromiferous dyestuffs made according to this invention, when compared with those made by the action of chromiferous azo-dyestuffs on azo-dyestuffs containing metal binding groups in acid or neutral medium, are characterized by more advantageous behavior in dyeing, in respect of solubility, levelling power, coloring strength, color tint and fastness.

Particularly valuable mixed chromiferous azo-dyestuffs are obtained by causing chromiferous ortho-hydroxyazo-dyestuffs to react in an alkaline medium with such ortho-hydroxyazo-dyestuffs which are different from the azo-dyestuffs used for producing the parent chromiferous azo-dyestuffs, the mixture entering the reaction containing at least one ortho-hydroxyazo-dyestuff which is obtained by coupling diazotized ortho-hydroxyaminonaphthalene sulfonic acids with hydroxynaphthalenes. In this case such mixed chromiferous azo-dyestuffs are obtained which are suitable for the production of very valuable, particularly navy blue and black tints on the animal fiber.

The mixed chromiferous azo-dyestuffs obtainable by this invention are advantageously applied in dyeing by the method of Patent 1,903,884 or from a dye-bath containing aromatic acids beside mineral acid; they yield very varied tints. They may be used for dyeing materials of any kind, such as wool, weighted and unweighted silk, leather, cotton or artificial silk, whether derived from cellulose ethers or cellulose esters, or regenerated cellulose; lacquers, such as contain a cellulose basis or a basis of natural or artificial resin; or as pigments or in printing.

The following examples illustrate the invention, the parts being by weight:—

Example 1

92.2 parts of the azo-dyestuff of the formula

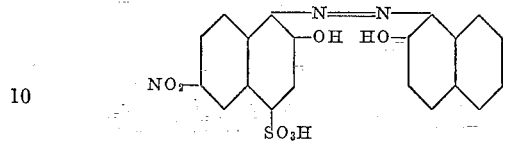

obtained by coupling nitrated 1-diazo-2-hydroxynaphthalene-4-sulfonic acid with 2-hydroxynaphthalene are stirred into 1800 parts of water and, after addition of a solution of chromium formate corresponding with 18.2 parts of $Cr_2O_3$, the whole is boiled for 6 hours in a reflux apparatus. The suspension of the greenish-black chromium compound thus produced is filtered, the chromium compound stirred with 1200 parts of water and mixed with 40 parts of the azo-dyestuff of the formula

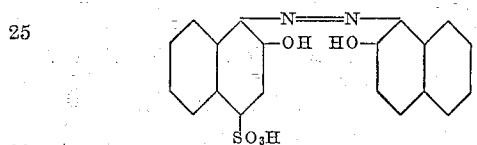

obtained by coupling diazotized 1-amino-2-hydroxynaphthalene-4-sulfonic acid with 2-hydroxynaphthalene. 160 parts of caustic soda solution of 30 per cent. strength are added and the whole boiled in a reflux apparatus for 4 hours. After cooling to 50–60° C. the mass is neutralized with hydrochloric acid of 10 per cent. strength and the mixed chromiferous dyestuff thus obtained is salted out. After filtration and drying there remains a dark powder freely soluble in water to a blue-black solution. It dyes wool in an acid bath black tints of very good fastness.

Example 2

70 parts of the chromium compound of the azo-dyestuff of the formula

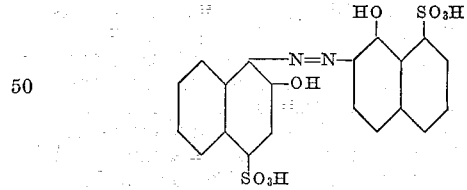

obtained by coupling diazotized 1-amino-2-hydroxynaphthalene-4-sulfonic acid with 1-hydroxynaphthalene-8-sulfonic acid are dissolved together with 21 parts of the azo-dyestuff of the formula

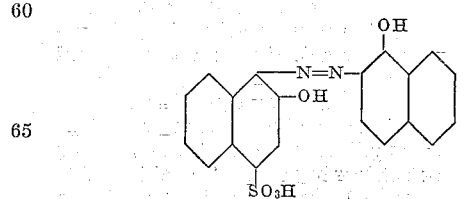

obtained by coupling diazotized 1-amino-2-hydroxynaphthalene-4-sulfonic acid and 1-hydroxynaphthalene in 800 parts of water and 100 parts of caustic soda solution of 30 per cent. strength, 5 parts of sugar being added, and the whole is boiled in a reflux apparatus for 4 hours. After addition of hydrochloric acid of 10 per cent. strength and a little formic acid until there is feeble acid reaction to litmus paper, the mass is evaporated to dryness in a vacuum. The chromium compound thus obtained is a violet-black powder and dissolves in water to a blue solution and dyes wool in an acid bath blue tints of outstanding fastness.

There is obtained a dyestuff having similar dyeing properties when instead of the chromium compound of the azo-dyestuff from diazotized 1-amino-2-hydroxynaphthalene-4-sulfonic acid and 1-hydroxynaphthalene-8-sulfonic acid that of the azo-dyestuff of the formula

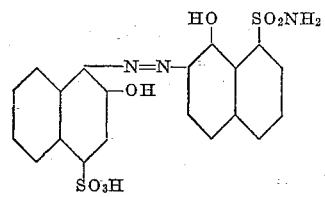

obtained by coupling the same diazo-component with 1-hydroxynaphthalene-8-sulfamide is used.

Example 3

110 parts of the chromium compound, obtained in acid medium, of the azo-dyestuff obtained by coupling diazotized 1-amino-2-hydroxynaphthalene-4-sulfonic acid with 2-hydroxynaphthalene, 41.1 parts of the azo-dyestuff of the formula

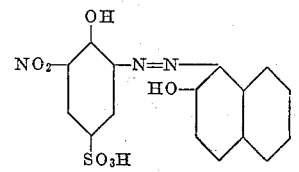

obtained by coupling diazotized 6-nitro-2-amino-1-phenol-4-sulfonic acid with 2-hydroxynaphthalene, 1500 parts of water and 200 parts of caustic soda solution of 30 per cent. strength are together heated to boiling in a reflux apparatus until no free ortho-hydroxyazo-dyestuff remains. The mass is then cooled to 50° C. and neutralized with hydrochloric acid of 10 per cent. strength. Then 5 parts of formic acid of 85 per cent. strength are added and the chromiferous dyestuff thus produced is salted out. It is a violet-black powder and dissolves very freely in water to a reddish blue-black solution. It dyes wool in a bath containing an organic acid and sulfuric acid dark marine blue tints of very good fastness.

Example 4

110 parts of the chromium compound of the azo-dyestuff obtained by coupling diazotized 1-amino-2-hydroxynaphthalene-4-sulfonic acid with 2-hydroxynaphthalene are dissolved in a mixture of 1500 parts of water, 200 parts of caustic soda solution of 30 per cent. strength and 10 parts of sugar, and there are then added 41.6 parts of the azo-dyestuff obtained by coupling diazotized 1-amino-2-hydroxynaphthalene-4-sulfonic acid with 1-hydroxynaphthalene, and the mixture is boiled in a reflux apparatus for 4 hours. After cooling to 50° C., the mass is made feebly acid to litmus by means of hydrochloric acid of 10 per cent. strength and some formic acid and the blue solution is evaporated to dryness in a vacuum. The new chromium compound, which represents a violet-black powder and is freely soluble in water, dyes wool in a sulfuric acid bath containing organic acid, marine blue tints of very good fastness.

If 58 parts of the chromium compound obtainable by chroming in acid medium the azo-dyestuff obtained by coupling nitrated 1-diazo-2-hydroxynaphthalene-4-sulfonic acid with 2-hydroxynaphthalene, are allowed to act as described in this example on 26 parts of the azo-dyestuff of the formula

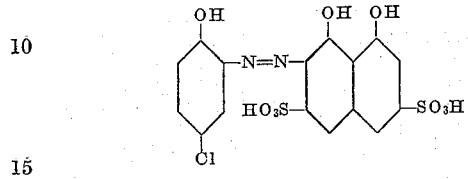

obtained by coupling diazotized 4-chloro-2-amino-1-phenol with 1:8-dihydroxynaphthalene-3:6-disulfonic acid, there is obtained a chromiferous dyestuff which dissolves in water to a blackish blue-violet solution and dyes wool in an acid bath very fast violet black shades.

Furthermore, if 50 parts of the chromium compound obtainable by chroming in acid medium the azo-dyestuff obtained by coupling nitrated 1-diazo-2-hydroxynaphthalene-4-sulfonic acid with 2-hydroxynaphthalene in the same manner as described in this example are allowed to act on 20 parts of the azo-dyestuff of the formula

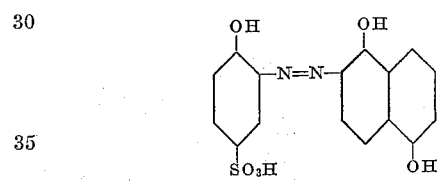

obtained by coupling diazotized 2-amino-1-phenol-4-sulfonic acid with 1:5-dihydroxynaphthalene there is obtained a chromium compound which is very freely soluble in water and when applied in the manner described in Patent 1,903,384 dyes wool very fast black shades.

*Example 5*

A chromium compound made by chroming in acid medium 92.2 parts of the azo-dyestuff obtained by coupling nitrated 1-diazo-2-hydroxynaphthalene-4-sulfonic acid with 2-hydroxynaphthalene and 44 parts of the azo-dyestuff of the formula

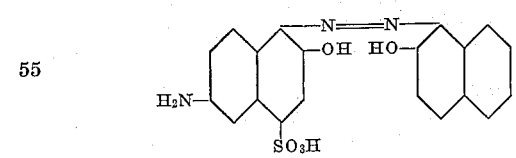

obtained by coupling nitrated 1-diazo-2-hydroxynaphthalene-4-sulfonic acid with 2-hydroxynaphthalene and reduced with sodium sulfide, is dissolved in 2000 parts of water with addition of 200 parts of caustic soda solution of 30 per cent. strength and 5 parts of sugar, and the solution is boiled in a reflux apparatus for 4 hours. After cooling to about 50° C., neutralizing with hydrochloric acid of 10 per cent. strength and adding formic acid until the reaction to litmus is feebly acid and filtering, there can be salted out from the solution a new chromium compound. This represents a black powder and dissolves in water freely to a violet black solution and dyes wool in a sulfuric acid bath containing organic acid a black shade of good fastness.

If 80 parts of the chromium compound of the formula

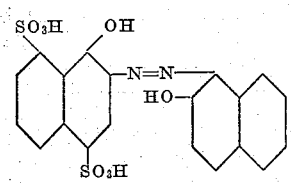

obtained by coupling diazotized 2-amino-1-hydroxynaphthalene-4:8-disulfonic acid with 2-hydroxynaphthalene are caused to act in manner similar to that described in this example on 20.8 parts of the azo-dyestuff obtained by coupling diazotized 1-amino-2-hydroxynaphthalene-4-sulfonic acid with 2-hydroxynaphthalene, there is obtained a mixed chromiferous azo-dyestuff which dyes very fast marine blue.

Furthermore, if 114 parts of the chromium compound obtainable by chroming in acid medium the azo-dyestuff obtained by coupling nitrated 1-diazo-2-hydroxynaphthalene-4-sulfonic acid with 2-hydroxynaphthalene are allowed to act in the manner described in this example on 41.6 parts of the azo-dyestuff obtained by coupling diazotized 1-amino-2-hydroxynaphthalene-4-sulfonic acid with 1-hydroxynaphthalene, there is obtained a dyestuff which dyes a very fast black.

*Example 6*

92.2 parts of the azo-dyestuff obtained by coupling nitrated 1-diazo-2-hydroxynaphthalene-4-sulfonic acid with 2-hydroxynaphthalene are chromed in acid medium and the separated chromium compound is introduced into a mixture of 46.1 parts of the azo-dyestuff of the formula

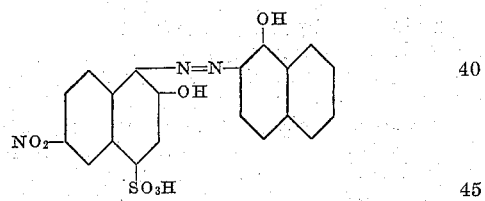

obtained by coupling nitrated 1-diazo-2-hydroxynaphthalene-4-sulfonic acid with 1-hydroxynaphthalene, 2000 parts of water and 200 parts of caustic soda solution of 30 per cent. strength; 10 parts of sugar are added and the mixture is boiled for 4 hours in a reflux apparatus. For separating any impurities which may be present, the liquor is filtered and the filtrate neutralized with hydrochloric acid of 10 per cent. strength and made feebly acid to litmus with formic acid; the solution thus obtained is evaporated to dryness in a vacuum. The new violet-black chromium compound thus obtained is freely soluble in water to a blackish red-violet solution. When dyed on wool in a bath containing organic acid and sulfuric acid black tints of very good fastness are obtained.

*Example 7*

A suspension of 46.1 parts of the azo-dyestuff obtained by coupling nitrated 1-diazo-2-hydroxynaphthalene-4-sulfonic acid with 2-hydroxynaphthalene in 1000 parts of water is mixed with a chromium formate solution corresponding with 9.12 parts of $Cr_2O_3$ and the whole is boiled for 10-12 hours.

Into the mixture thus made there are stirred 31.2 parts of the azo-dyestuff obtained by coupling diazotized 1-amino-2-hydroxynaphthalene-4-sulfonic acid with 2-hydroxynaphthalene; the solution is made alkaline by addition of 160 parts of caustic soda solution of 30 per cent. strength, then heated gradually and finally boiled until the added azo-dyestuff has disappeared. The violet solution thus obtained is filtered from impurities, the filtrate is neutralized with strongly diluted mineral acid and the mixed chromiferous dyestuff is separated by addition of common salt.

It dyes wool in a bath containing sulfuric acid and organic acid dark marine blue tints of very good fastness.

Example 8

35 parts each of the chromium compounds made in alkaline medium from the azo-dyestuff obtained by coupling diazotized 1-amino-2-hydroxynaphthalene-4-sulfonic acid with 1-hydroxynaphthalene on the one hand and 2-hydroxynaphthalene on the other hand, are dissolved in 600 parts of water with addition of 100 parts of caustic soda solution of 30 per cent. strength. To the solution 26 parts of the azo-dyestuff obtained by coupling diazotized 4-chloro-2-amino-1-hydroxybenzene with 1:8-dihydroxynaphthalene-3:6-disulfonic acid are added and the mixture is boiled in a reflux apparatus for 4 to 5 hours. The mass is then filtered from a small amount of impurities and the filtrate is neutralized with very strongly diluted mineral acid and then evaporated to dryness in a vacuum.

The mixed chromiferous dyestuff thus obtained is a black violet powder which dyes wool in a dye-bath containing sulfuric acid and organic acid marine blue tints of very good fastness.

Example 9

60 parts of the chromium compound of the azo-dyestuff obtained by coupling diazotized 1-amino-2-hydroxynaphthalene-4-sulfonic acid with 2-hydroxynaphthalene, which chromium compound is obtainable by boiling for 8 hours the said azo-dyestuff with chromium formate, are dissolved in 600 parts of caustic soda solution of 7 per cent. strength and the solution is mixed with 10.4 parts of the sodium salt of the dyestuff obtained by coupling diazotized 1-amino-2-hydroxynaphthalene-4-sulfonic acid with 1-hydroxynaphthalene and also with 10.4 parts of the sodium salt of the dyestuff obtained by coupling diazotized 1-amino-2-hydroxynaphthalene-4-sulfonic acid with 2-hydroxynaphthalene, and the whole is boiled for some hours. Neutralization with strongly diluted mineral acid follows. The blackish-blue solution is filtered and the new mixed chromiferous dyestuff is precipitated by addition of common salt.

It dyes wool, preferably in a sulfuric acid bath containing an organic acid, marine blue tints of very good fastness.

Example 10

41.6 parts of the azo-dyestuff obtained by coupling diazotized 1-amino-2-hydroxynaphthalene-4-sulfonic acid with 2-hydroxynaphthalene, together with 44.7 parts of the azo-dyestuff of the formula

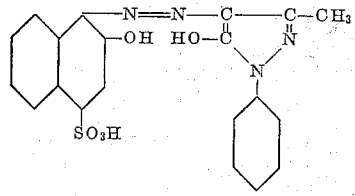

obtained by coupling diazotized 1-amino-2-hydroxynaphthalene-4-sulfonic acid with 1-phenyl-3-methyl-5-pyrazolone, are mixed, in 1200 parts of water, with chromium formate corresponding with 18.24 parts of $Cr_2O_3$ and the whole is boiled for 15 hours. The chromium compound of the dyestuff, which in greater part has already separated, is completely separated by addition of common salt. The compound is filtered and the wet mass, together with 52 parts of the azo-dyestuff obtained by coupling diazotized 1-hydroxy-2-amino-4-chlorobenzene with 1:8-dihydroxynaphthalene-3:6-disulfonic acid is introduced into 900 parts of caustic soda solution of 7 per cent. strength. After boiling for 4–5 hours in a reflux apparatus the mass is neutralized with strongly diluted mineral acid, filtered from a small quantity of impurities, and the violet filtrate is evaporated to dryness in a vacuum at the water-bath temperature.

The new mixed chromiferous dyestuff is a violet-black powder which dyes wool in an acid bath violet-blue tints of good fastness.

One arrives at the same result if in this example the chromiferous dyestuff serving as the chroming agent is not separated.

Example 11

In 400 parts of a caustic soda solution of 6 per cent. strength there are dissolved 30 parts of the chromium compound of the azo-dyestuff obtained by coupling diazotized 1-amino-2-hydroxynaphthalene-4-sulfonic acid with 1-hydroxynaphthalene together with 30 parts of the chromium compound of the azo-dyestuff obtained by coupling diazotized 1-amino-2-hydroxynaphthalene-4-sulfonic acid with 2-hydroxynaphthalene, which have both been made by chroming in alkaline medium, and there are added 10.6 parts of the azo-dyestuff obtained by coupling diazotized 1-amino-2-hydroxynaphthalene-4-sulfonic acid with 1-phenyl-3-methyl-5-pyrazolone together with 9.6 parts of the azo-dyestuff of the formula

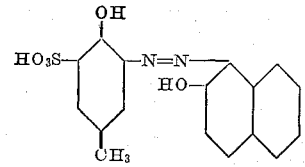

obtained by coupling diazotized 2-amino-1-hydroxy-4-methylbenzene-6-sulfonic acid with 2-hydroxynaphthalene, and the whole is boiled in a reflux apparatus for 4–5 hours. After filtering from a small quantity of impurities the mass is neutralized with mineral acid of about 5 per cent. strength and the mixed chromiferous dyestuff is salted out from the blue-violet solution by addition of common salt, or is obtained by evaporation in a vacuum.

It dyes wool in a sulfuric acid bath containing an organic acid reddish marine-blue tints of pronounced fastness.

Example 12

Into a potassium chromite solution, obtained in known manner from 60 parts of potassium hydroxide of 90 per cent. strength and a chromium paste of 14 per cent. strength containing 8.74 parts of $Cr_2O_3$, are introduced 41.5 parts of the azo-dyestuff obtained by coupling diazotized 1-amino-2-hydroxynaphthalene-4-sulfonic acid with 2-hydroxynaphthalene. The mixture is stirred for 16 hours at 75 to 80° C. and then heated to 85° C. until the formation of a chromium compound dyeing blue in a sulfuric acid dye-bath has come to an end. The whole is diluted with 500 parts of hot water, 20.8 parts of the azo-dyestuff obtained by coupling diazotized 1-amino-2-hydroxynaphthalene-4-sulfonic acid with 1-hydroxynaphthalene are added and the whole is boiled in a reflux apparatus until the azo-dyestuff has disappeared. The blue solution is cautiously neutralized with strongly diluted mineral acid, filtered from some chromium mud and the mixed chromiferous dyestuff is salted out by addition of common salt.

It dyes wool, preferably in a sulfuric acid bath containing organic acid, marine blue tints of very good fastness.

Example 13

A paste of the chromium compound of the azo-dyestuff obtained by coupling diazotized 1-amino-2-hydroxynaphthalene-4-sulfonic acid with 2-hydroxynaphthalene, obtainable by boiling for 10 hours 41.6 parts of the azo-dyestuff with a chromium formate solution corresponding with 9.12 parts of $Cr_2O_3$ and separating by filtration, is stirred into 600 parts of caustic soda solution of 6 per cent. strength. To this mixture 19.1 parts of the azo-dyestuff obtained by coupling diazotized 1-hydroxy-2-amino-4-methylbenzene-6-sulfonic acid with 2-hydroxynaphthalene are added and the whole is boiled for 4 hours in a reflux apparatus. After dilution to about 1000 parts a small quantity of impurities is filtered and the filtrate neutralized with strongly diluted hydrochloric acid, whereupon this blue-violet solution is evaporated to dryness in a vacuum.

The new mixed chromiferous dyestuff is a violet black powder which dyes wool in an acid bath marine blue tints of very good fastness.

Example 14

60 parts of the chromium compound of the azo-dyestuff obtained by coupling diazotized 1-amino-2-hydroxynaphthalene-4-sulfonic acid with 2-hydroxynaphthalene (obtainable by chroming the dyestuff in an acid medium) are dissolved in 800 parts of caustic soda solution of 4 per cent. strength, 15 parts of the azo-dyestuff of the formula

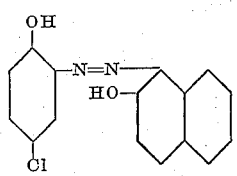

obtained by coupling diazotized 2-amino-1-hydroxy-4-chlorobenzene with 2-hydroxynaphthalene are added and the whole is boiled in a reflux apparatus for 3-4 hours while stirring. The mass is diluted and filtered from a small quantity of impurities. The filtrate is neutralized with strongly diluted mineral acid and the new mixed chromiferous dyestuff is salted out.

It is a violet black powder, freely soluble in water to a blue solution, and dyes wool in an acid bath dark marine blue tints of good fastness.

Example 15

83.2 parts of the azo-dyestuff obtained by coupling diazotized 1-amino-2-hydroxynaphthalene-4-sulfonic acid with 2-hydroxynaphthalene are converted into the chromium compound by boiling for 8 hours with a chromium formate solution corresponding with 18.2 parts of $Cr_2O_3$. This chromium compound is isolated and dissolved together with 46.1 parts of the azo-dyestuff obtained by coupling nitrated 1-diazo-2-hydroxy naphthalene-4-sulfonic acid with 2-hydroxynaphthalene in 1600 parts of water and 200 parts of caustic soda solution of 30 per cent. strength. The union between the two dyestuffs occurs quickly when the solution is heated, and as soon as the boiling point is attained there are only traces of the chrome-free azo-dyestuff to be detected. The heating is continued to boiling for ½ hour, the mass is cooled to 50° C., made feebly acid to litmus by means of hydrochloric acid of 10 per cent. strength and some formic acid and the chromiferous azo-dyestuff produced is separated by salting out while hot.

The dyestuff is freely soluble in water to a blackish blue solution and dyes wool in a sulfuric acid bath containing an organic acid, according to the process of Patent 1,903,884, dark marine blue tints of excellent fastness.

Example 16

60 parts of a chromium compound made by chroming in an acid medium the azo-dyestuff obtained by coupling nitrated 1-diazo-2-hydroxynaphthalene-4-sulfonic acid with 2-hydroxynaphthalene, are dissolved in 1000 parts of water with addition of 100 parts of caustic soda solution of 30 per cent. strength; 15.5 parts of the azo-dyestuff of the formula

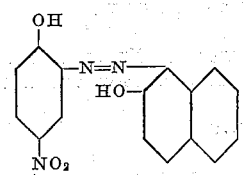

obtained by coupling diazotized 4-nitro-2-amino-1-hydroxybenzene with 2-hydroxynaphthalene are added and the mixture is boiled for 4-5 hours in a reflux apparatus while stirring. The whole is then diluted to about 2000 parts with water, filtered from a small quantity of impurities and the filtrate cautiously neutralized with mineral acid of 10 per cent. strength. The new mixed chromiferous dyestuff is now salted out.

It is a black powder which dyes wool, preferably in a sulfuric acid bath containing organic acid, deep black shades of good fastness.

Example 17

10 parts of the chromium compound of the azo-dyestuff of the formula

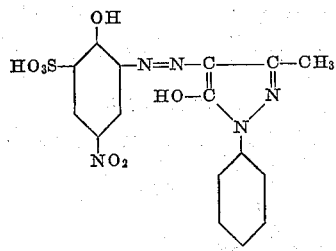

obtained by coupling diazotized 2-amino-4-nitro-1-hydroxybenzene-6-sulfonic acid with 1-phenyl-3-methyl-5-pyrazolone, are dissolved in 50 parts of hot water while adding 1.2 parts of caustic soda solution of 30 per cent. strength, and, after addition of a solution consisting of 1.5 parts of the azo-dyestuff of the formula

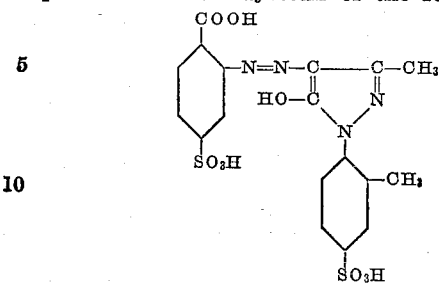

obtained by coupling diazotized 2-amino-4-sulfo-1-benzoic acid with 1-(2'-methyl-4'-sulfophenyl)-3-methyl-5-pyrazolone and 0.6 part of caustic soda solution of 30 per cent. strength in 50 parts of water, the whole is boiled for 12 hours in a reflux apparatus, then neutralized and evaporated to dryness.

There is obtained a reddish-brown dyestuff powder which dissolves in water and soda solution of 10 per cent. strength to an orange-yellow solution, in caustic soda solution of 10 per cent. strength as well as in concentrated sulfuric acid to a yellow solution, and dyes wool from a sulfuric acid bath orange tints.

*Example 18*

10 parts of the chromium compound of the azo-dyestuff obtained by coupling diazotized 2-amino-4-nitro-1-hydroxybenzene-6-sulfonic acid with 1-phenyl-3-methyl-5-pyrazolone, are dissolved in 75 parts of hot water while adding 1.2 parts of caustic soda solution of 30 per cent. strength, and after addition of a solution consisting of 1.5 parts of the azo-dyestuff of the formula

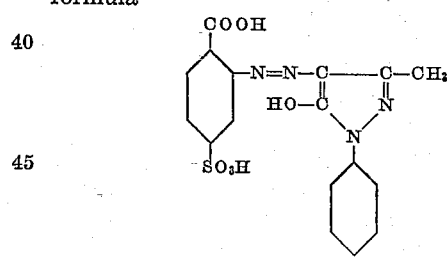

obtained by coupling diazotized 2-amino-4-sulfobenzoic acid with 1-phenyl-3-methyl-5-pyrazolone, as well as 0.7 part of caustic soda solution of 30 per cent. strength in 50 parts of water, the whole is boiled for 12 hours in a reflux apparatus, then neutralized and evaporated to dryness.

The dyestuff represents a reddish-brown powder which dissolves in water to a brownish-yellow solution, in dilute soda solution or caustic soda solution to an orange-yellow solution, and in concentrated sulfuric acid to a yellow solution, and dyes wool from a sulfuric acid bath orange tints.

*Example 19*

10 parts of the chromium compound of the azo-dyestuff of the formula

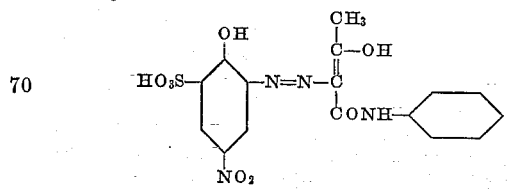

obtained by coupling diazotized 2-amino-4-nitro-1-hydroxybenzene-6-sulfonic acid with acetoacetic acid anilide, are dissolved in 400 parts of water while adding 2.4 parts of caustic soda solution of 30 per cent. strength, and mixed with a solution consisting of 1.5 parts of the azo-dyestuff of the formula

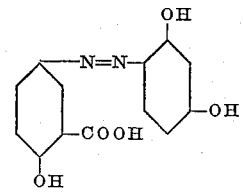

obtained by coupling diazotized 5-amino-2-hydroxybenzoic acid with 1.3-dihydroxybenzene and 0.5 part of sodium hydroxide in 50 parts of water. The whole is then boiled for 12 hours and salted out.

After drying there is obtained a brown dyestuff powder which dissolves in soda solution of 10 per cent. strength and in concentrated sulfuric acid to a yellow solution, in caustic soda solution of 10 per cent. strength to a brownish-yellow solution. It dyes wool from a sulfuric acid bath yellow tints.

*Example 20*

10 parts of the chromium compound of the azo-dyestuff obtained by coupling diazotized 2-amino-4-nitro-1-hydroxybenzene-6-sulfonic acid with 1-phenyl-3-methyl-5-pyrazolone, are dissolved in 50 parts of water while adding 0.8 part of sodium hydroxide, mixed with a solution consisting of 1.5 parts of the azo-dyestuff of the formula

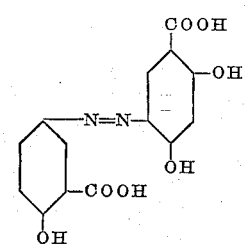

obtained by coupling diazotized 5-amino-2-hydroxybenzoic acid with 2,4-dihydroxybenzoic acid and 0.7 part of caustic soda solution of 30 per cent. strength in 50 parts of water, and boiled for 12 hours in a reflux apparatus. The dyestuff is separated by addition of common salt and worked up in the usual manner.

When dry it represents a brown powder which dissolves in water and in concentrated sulfuric acid to a brown-yellow solution, and dyes wool from a sulfuric acid bath orange tints.

*Example 21*

10 parts of the chromium compound of the azo-dyestuff of the formula

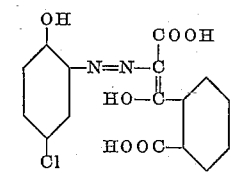

obtained by coupling diazotized 4-chloro-2-amino-1-hydroxybenzene with benzoylacetic-ortho-carboxylic acid, are dissolved in 50 parts of water while adding 1.2 parts of caustic soda solution of 30 per cent. strength. To this solution there is added a solution of 1.5 parts of the azo-dyestuff obtained by coupling diazotized 2 - amino - 4 - sulfo - 1 - benzoic acid with 1-(2'-methyl -4'- sulfophenyl) - 3 -methyl-5-pyrazolone and 0.6 part of sodium hydroxide in 50 parts of water. The whole is boiled for 12 hours, neutralized and evaporated to dryness.

There is obtained a dark dyestuff powder which dissolves in water, soda solution and caustic soda solution to a green solution, in concentrated sulfuric acid to a ruby-red solution, and dyes wool from a sulfuric acid bath yellowish-green tints.

*Example 22*

28.5 parts of the chromium compound of the azo-dyestuff obtained by coupling diazotized 2-amino-4-sulfobenzoic acid with 1-(2'-methyl-4'-sulfo)-phenyl-3-methyl-5-pyrazolone and 4.6 parts of the azo-dyestuff of the formula

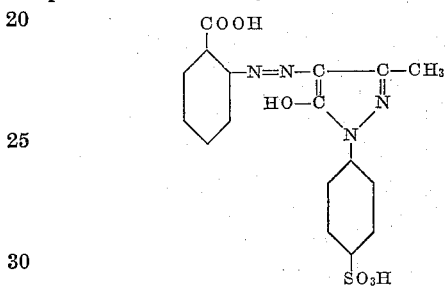

obtained by coupling diazotized anthranilic acid with 1-(4'-sulfo)-phenyl-3-methyl-5-pyrazolone, are dissolved in 150 parts of water, and, after addition of caustic soda solution, the whole is mixed with 15 parts of crystallized sodium acetate until it shows a neutral reaction. The mixture is heated to boiling for about 16 hours in a reflux apparatus, filtered and the filtrate evaporated to dryness in a vacuum.

The dyestuff thus obtained represents a yellowish-brown powder which dissolves in water, soda solution of 10 per cent. strength or caustic soda solution to a reddish tinged yellow solution, in concentrated sulfuric acid to a greenish yellow solution, and dyes wool from an acid bath reddish tinged yellow tints.

*Example 23*

28.5 parts of the chromium compound of the azo-dyestuff obtained by coupling diazotized 2-amino-4-sulfobenzoic acid with 1-(2'-methyl-4'-sulfo)-phenyl-3-methyl-5-pyrazolone and 4 parts of the azo-dyestuff of the formula

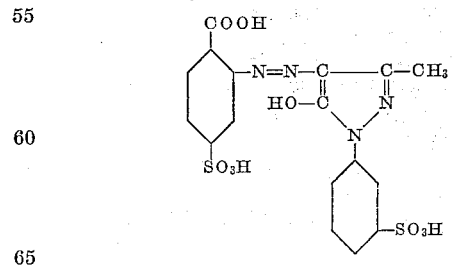

obtained by coupling diazotized 2-amino-4-sulfobenzoic acid with 1-(3'-sulfo)-phenyl-3-methyl-5-pyrazolone, are dissolved in 150 parts of water, and, after addition of caustic soda solution, the whole is mixed with 15 parts of crystallized sodium acetate until it shows a neutral reaction. The mixture is then heated to the boil in a reflux apparatus for about 16 hours, filtered, and the filtrate evaporated to dryness in a vacuum.

The dyestuff thus obtained represents a yellow-brown powder which dissolves in water, soda solution of 10 per cent. strength or caustic soda solution to a reddish tinged yellow solution, in concentrated sulfuric acid to a greenish tinged yellow solution, and dyes wool from an acid bath red tinged yellow tints.

*Example 24*

24.8 parts of the chromium compound of the azo-dyestuff of the formula

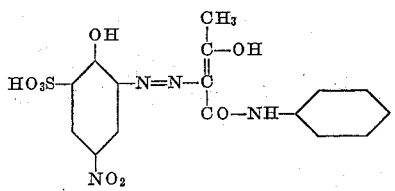

obtained by coupling diazotized 4-nitro-2-amino-1-phenyl-6-sulfonic acid with acetoacetic acid anilide and 4 parts of the azo-dyestuff of the formula

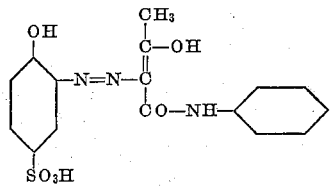

obtained by coupling diazotized 2-amino-1-phenol-4-sulfonic acid with acetoacetic acid anilide, 300 parts of water, and 5 parts of sodium carbonate are heated to boiling in a reflux apparatus for about 16 hours. The reaction mixture is subsequently acidified with dilute acetic acid and the chromium compound separated by addition of common salt and then filtered.

The dyestuff, when dry, represents a brown powder which dissolves in water and concentrated sulfuric acid to a red tinged yellow solution. In soda solution of 10 per cent. strength or caustic soda solution it also dissolves to a red tinged yellow solution, and dyes wool from an acid bath red tinged yellow tints.

*Example 25*

24.8 parts of the chromium compound of the azo-dyestuff obtained by coupling diazotized 4-nitro-2-amino-1-phenol-6-sulfonic acid with acetoacetic acid anilide and 4.4 parts of the azo-dyestuff of the formula

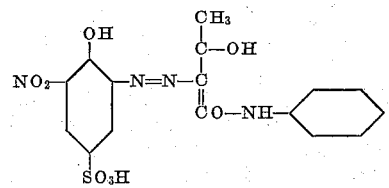

obtained by coupling diazotized 6-nitro-2-amino-1-phenol-4-sulfonic acid with acetoacetic acid anilide, 300 parts of water, and 5 parts of sodium carbonate are heated to boiling in a reflux apparatus for about 16 hours. The reaction mixture is subsequently acidified with dilute acetic acid and the chromium compound separated by addition of common salt and then filtered.

The dyestuff, when dry, represents a brown powder which dissolves in water and concentrated sulfuric acid to a red tinged yellow solution. In soda solution of 10 per cent. strength or caustic soda solution it also dissolves to a red tinged yellow solution, and dyes wool from an acid bath brown-yellow tints.

Example 26

26.9 parts of the chromium compound of the azo-dyestuff of the formula

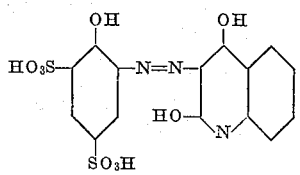

obtained by coupling diazotized 2-amino-1-phenol-4,6-disulfonic acid with 2,4-dihydroxyquinoline and 4.5 parts of the azo-dyestuff of the formula

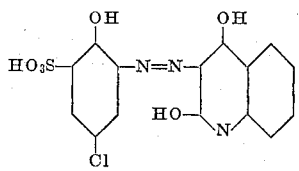

obtained by coupling diazotized 4-chloro-2-amino-1-phenol-6-sulfonic acid with 2,4-dihydroxyquinoline, 160 parts of water, and 5 parts of sodium carbonate are heated to boiling in a reflux apparatus for some time. The reaction mixture is then neutralized by addition of common salt and the solution obtained evaporated to dryness in a vacuum.

The dyestuff thus obtained represents a dark brown-red powder which dissolves in water, soda solution of 10 per cent. strength or caustic soda solution to a blue-red solution, in concentrated sulfuric acid to a brown-yellow solution, and dyes wool from an acid bath Bordeaux-red tints fast to alkalies.

Example 27

10 parts of the chromium compound of the azo-dyestuff of the formula

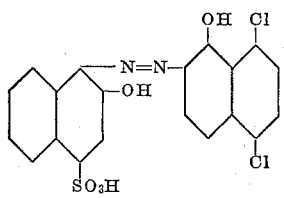

obtained by coupling diazotized 1-amino-2-hydroxynaphthalene-4-sulfonic acid with 5,8-dichloro-1-hydroxynaphthalene are dissolved in 400 parts of hot water with addition of 5.5 parts of caustic soda solution of 30 per cent. strength, and after addition of a solution consisting of 1.5 parts of the azo-dyestuff obtained by coupling diazotized 1-amino-2-hydroxynaphthalene-4-sulfonic acid with 2-hydroxynaphthalene and 0.6 part of a caustic soda solution of 30 per cent. strength in 100 parts of water, the whole is boiled for 12 hours. The dyestuff is completely separated by addition of common salt, filtered off and evaporated to dryness.

It represents a dark powder which dissolves in water, sodium carbonate and dilute caustic soda solution to a blue solution, and dyes wool from a sulfuric acid bath blue tints.

Example 28

10 parts of the chromium compound of the azo-dyestuff of the formula

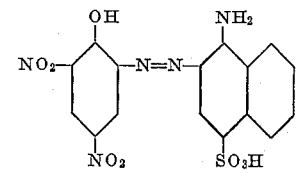

obtained by coupling diazotized 2-amino-4,6-dinitro-1-hydroxybenzene with 1-aminonaphthalene-4-sulfonic acid are dissolved in 400 parts of water with addition of 1.2 parts of caustic soda solution of 30 per cent. strength. To this there is added a solution consisting of 1.5 parts of the azo-dyestuff obtained by coupling diazotized 2-amino-4-nitro-1-hydroxybenzene-6-sulfonic acid with acetoacetic acid anilide, 0.4 part of caustic soda solution of 30 per cent. strength, and 40 parts of water, and the whole is boiled for 12 hours. After cooling down the dyestuff is salted out and evaporated to dryness.

It represents a dark powder which dissolves in water, soda solution of 10 per cent. strength and caustic soda solution of 10 per cent. strength to a greenish solution, in concentrated sulfuric acid to a ruby-red solution, and dyes wool from a sulfuric acid bath olive green tints.

Example 29

2 parts of the chromium compound of the azo-dyestuff obtained by coupling nitrated 1-diazo-2-hydroxynaphthalene-4-sulfonic acid with 2-hydroxynaphthalene are dissolved in 400 parts of hot water with addition of 1.6 parts of caustic soda solution of 30 per cent. strength, and mixed with a solution consisting of 0.4 part of the azo-dyestuff of the formula

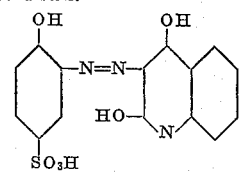

obtained by coupling diazotized 2-amino-1-hydroxybenzene-4-sulfonic acid with 2,4-dihydroxyquinoline, 0.7 part of caustic soda solution of 30 per cent. strength and 100 parts of water, and boiled in a reflux apparatus for 12 hours. The dyestuff is then filtered off and evaporated to dryness.

It represents a dark powder which dissolves in water, soda solution and caustic soda solution to a brownish-violet solution, in concentrated sulfuric acid to a red-violet solution, and dyes wool from a sulfuric acid bath violet-brown tints.

Example 30

2 parts of the chromium compound of the azo-dyestuff obtained by coupling nitrated 1-diazo-2-hydroxynaphthalene-4-sulfonic acid with 2-hydroxynaphthalene are dissolved in 400 parts of hot water with addition of 1.6 parts of caustic soda, and mixed with a solution consisting of 0.4 part of the azo-dyestuff of the formula

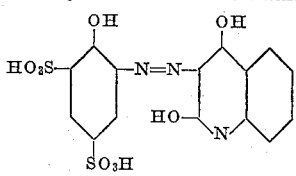

obtained by coupling diazotized 2-amino-1-hydroxybenzene-4,6-disulfonic acid with 2,4-dihydroxyquinoline, 0.7 part of caustic soda solution of 30 per cent. strength, and 100 parts of water, and boiled in a reflux apparatus for 12 hours. The dyestuff is then filtered off and evaporated to dryness.

There is obtained a dark dyestuff powder which dissolves in water to a muddy violet solution, in soda solution and caustic soda solution to a brownish-violet solution, in concentrated sulfuric acid to a red-violet solution, and dyes wool from a sulfuric acid bath brown-violet tints.

*Example 31*

2 parts of the chromium compound of the azo-dyestuff obtained by coupling nitrated 1-diazo-2-hydroxynaphthalene-4-sulfonic acid with 2-hydroxynaphthalene are dissolved in 400 parts of hot water with addition of 1.6 parts of caustic soda solution, mixed with a solution consisting of 0.3 part of the azo-dyestuff of the formula

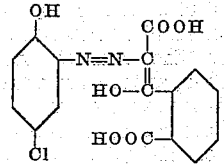

obtained by coupling diazotized 4-chloro-2-amino-1-hydroxybenzene and benzoylacetic-ortho-carboxylic acid, 0.7 part of caustic soda solution of 30 per cent. strength and 100 parts of water, and boiled in a reflux apparatus for 12 hours. The dyestuff is then filtered off and evaporated to dryness.

There is obtained a dark dyestuff powder which dissolves in water, soda solution and caustic soda solution to a blackish-violet solution, in concentrated sulfuric acid to a red-violet solution, and dyes wool from a sulfuric acid bath black-grey tints.

*Example 32*

9.8 parts of the chromium compound of the azo-dyestuff of the formula

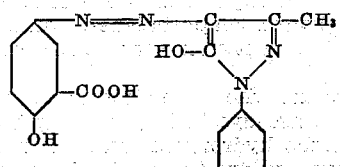

obtained by coupling diazotized 5-amino-2-hydroxybenzoic acid with 1-(3'-sulfo)-phenyl-3-methyl-5-pyrazolone and 1.8 parts of the azo-dyestuff of the formula

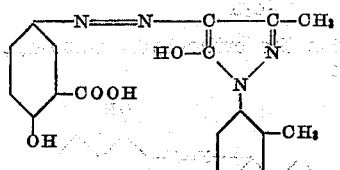

obtained by coupling diazotized 5-amino-2-hydroxybenzoic acid with 1-(2'-methyl-4'-sulfo)-phenyl-3-methyl-5-pyrazolone, 150 parts of water, and 6 parts of crystallized sodium acetate are heated to boiling in a reflux apparatus for about 18 hours. The dyestuff is then separated by addition of common salt and filtered.

The dyestuff, when dry, represents a brown-red powder which dissolves in water to a brown-orange solution, in soda solution of 10 per cent. strength to a brown-yellow solution, in caustic soda solution of 10 per cent. strength to a yellow solution, and in concentrated sulfuric acid to an orange-yellow solution. It dyes wool from an acid bath yellow orange tints.

*Example 33*

10 parts of the chromium compound of the azo-dyestuff of the formula

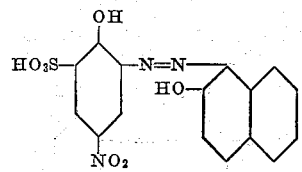

obtained by coupling diazotized 2-amino-4-nitro-1-hydroxybenzene-6-sulfonic acid with 2-hydroxynaphthalene are dissolved in 50 parts of hot water with addition of 1.2 grams of sodium hydroxide. To this there is added a solution consisting of 0.8 part of sodium hydroxide, 1.5 parts of the azo-dyestuff of the formula

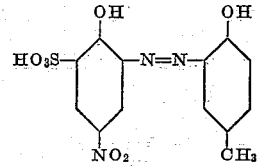

obtained by coupling diazotized 2-amino-4-nitro-1-hydroxybenzene-6-sulfonic acid with 1-hydroxy-4-methylbenzene and 50 parts of water, and the whole is boiled for 12 hours whereupon the dyestuff is salted out and dried.

It represents a dark powder which dissolves in water, soda solution of 10 per cent. strength, caustic soda solution of 10 per cent. strength to a red solution, in concentrated sulfuric acid to a ruby-red solution, and dyes wool from a sulfuric acid bath blackish-brown tints.

*Example 34*

20 parts of a chromium compound of the azo-dyestuff of the formula

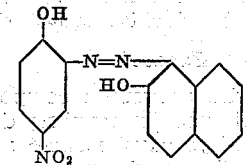

obtained by coupling diazotized 4-nitro-2-amino-1-phenol with 2-hydroxynaphthalene, which chromium compound contains one atom of chromium for each chromeable group of the dyestuff molecule, 1000 parts of water and 20 parts of caustic soda solution of 30 per cent. strength are heated to boiling, and there are added 2.7 parts of the sodium salt of the azo-dyestuff of the formula

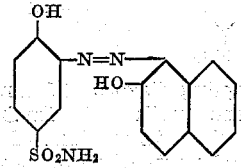

obtained by coupling diazotized 2-amino-1-phenol-4-sulfamide with 2-hydroxynaphthalene whereupon the whole is heated to boiling in a reflux apparatus for 40 hours. The mixture is then made weakly acid with dilute formic acid, whereby the dyestuff separates completely.

After filtering, washing and drying there is obtained a brown-black powder which dissolves in water and sodium carbonate sparingly to a brown-violet solution, in caustic soda solution to a red-brown solution and in concentrated sulfuric acid to a red-violet solution. From a solution in nitrocellulose lacquer there are obtained violet-brown coatings on suitable substrata.

*Example 35*

10 parts of the chromium compound of the azo-dyestuff of the formula

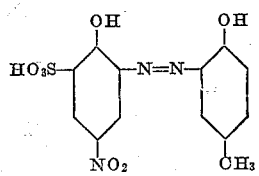

obtained by coupling diazotized 2-amino-4-nitro-1-hydroxybenzene-6-sulfonic acid with 4-methyl-1-hydroxybenzene are dissolved in 100 parts of hot water with addition of 4 parts of caustic soda solution of 30 per cent. strength. To this there is added a solution consisting of 1.5 parts of the azo-dyestuff of the formula

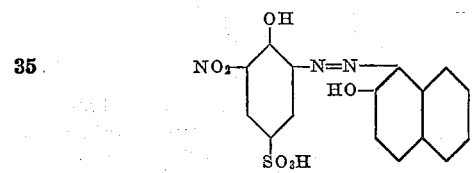

obtained by coupling diazotized 2-amino-6-nitro-1-hydroxybenzene-4-sulfonic acid with 2-hydroxynaphthalene, 0.7 part of caustic soda solution of 30 per cent. strength, and 100 parts of water, and the whole is heated in a reflux apparatus for several hours. The mixture is then neutralized with acetic acid and the dyestuff separated by addition of common salt.

When dry it represents a dark powder which dissolves in water and dilute alkalies to a brown solution, in concentrated sulfuric acid to a yellowish brown solution, and dyes wool from a sulfuric acid bath blackish-brown tints.

*Example 36*

10 parts of the chromium compound of the azo-dyestuff obtained by coupling diazotized 2-amino-4-nitro-1-hydroxybenzene-6-sulfonic acid with 4-methyl-1-hydroxybenzene are dissolved in 100 parts of hot water with addition of 4 parts of caustic soda solution of 30 per cent. strength. To this there is added a solution consisting of 1.5 parts of the azo-dyestuff of the formula

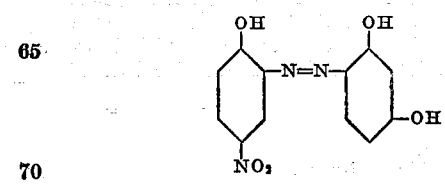

obtained by coupling diazotized 2-amino-4-nitro-1-hydroxybenzene with 1,3-dihydroxybenzene, 0.7 part of caustic soda solution of 30 per cent. strength, and 150 parts of water, and the whole is boiled for several hours in a reflux apparatus. This mixture is then neutralized with acetic acid and the dyestuff salted out.

When dry it represents a dark powder which dissolves in water and dilute alkalies to a red-brown solution, in concentrated sulfuric acid to a yellowish brown solution, and dyes wool from a sulfuric acid bath dark brown tints.

What we claim is:—

1. Process for the manufacture of mixed chromiferous azo-dyestuffs, by causing chromiferous azo-dyestuffs to react with such azo-dyestuffs containing metal binding groups which are different from the azo-dyestuffs used for producing the parent chromiferous azo-dyestuffs, consisting in conducting the reaction in an alkaline medium.

2. Process for the manufacture of mixed chromiferous azo-dyestuffs, by causing chromiferous ortho-hydroxyazo-dyestuffs to react with such ortho-hydroxyazo-dyestuffs which are different from the ortho-hydroxyazo-dyestuffs used for producing the parent chromiferous ortho-hydroxyazo-dyestuffs, consisting in conducting the reaction in an alkaline medium.

3. Process for the manufacture of mixed chromiferous azo-dyestuffs by causing chromiferous ortho-hydroxyazo-dyestuffs to react with such ortho-hydroxyazo-dyestuffs which are different from the ortho-hydroxyazo-dyestuffs used for producing the parent chromiferous ortho-hydroxyazo-dyestuffs, the mixture entering the reaction containing at least one ortho-hydroxyazo-dyestuff which is obtained by coupling diazotized ortho-hydroxyaminonaphthalene sulfonic acids with hydroxynaphthalenes, consisting in conducting the reaction in an alkaline medium.

4. Process for the manufacture of mixed chromiferous azo-dyestuffs by causing chromiferous ortho-hydroxyazo-dyestuffs to react with such ortho-hydroxyazo-dyestuffs which are different from the ortho-hydroxyazo-dyestuffs used for producing the parent chromiferous ortho-hydroxyazo-dyestuffs, the mixture entering the reaction containing at least one ortho-hydroxyazo-dyestuff which is obtained by coupling diazotized ortho-hydroxyaminonaphthalene sulfonic acids with hydroxynaphthalenes, consisting in conducting the reaction in the presence of caustic alkalies.

5. Process for the manufacture of a mixed chromiferous azo-dyestuff by causing the chromiferous ortho-hydroxyazo-dyestuff from the ortho-hydroxyazo-dyestuff of the formula

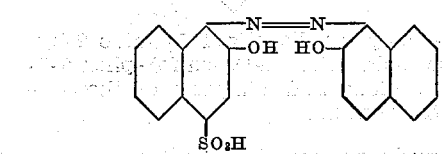

to react with the ortho-hydroxyazo-dyestuff of the formula

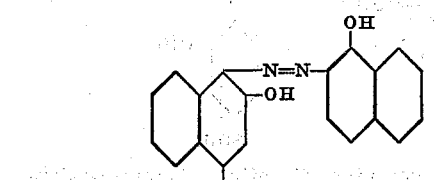

consisting in conducting the reaction in the presence of caustic alkalies.

6. Mixed chromiferous azo-dystuffs obtained by causing chromiferous azo-dyestuffs to react in an alkaline medium with such azo-dyestuffs containing metal binding groups which are different from the azo-dyestuffs used for producing the parent chromiferous azo-dyestuffs, which products represent yellow to brown to red to violet-black to black powders, dissolving in water to yellow to red to violet to blue to green to black solutions, and dyeing materials yellow to orange to brown to red to violet to blue to green to black tints.

7. Mixed chromiferous azo-dyestuffs obtained by causing chromiferous ortho-hydroxyazo-dyestuffs to react in an alkaline medium with such azo-dyestuffs which are different from the ortho-hydroxyazo-dyestuffs used for producing the parent chromiferous ortho-hydroxyazo-dyestuffs, which products represent yellow to brown to red to violet-black to black powders, dissolving in water to yellow to red to violet to blue to green to black solutions, and dyeing materials yellow to orange to brown to red to violet to blue to green to black tints.

8. Mixed chromiferous azo-dyestuffs obtained by causing chromiferous azo-dyestuffs to react in an alkaline medium with such ortho-hydroxyazo-dyestuffs which are different from the ortho-hydroxyazo-dyestuffs used for producing the parent chromiferous ortho-hydroxyazo-dyestuffs, the mixture entering the reaction containing at least one ortho-hydroxyazo-dyestuff which is obtained by coupling diazotized ortho-hydroxyaminonaphthalene sulfonic acids with hydroxynaphthalenes, which products represent dark powders, dissolving in water to violet to blue to black solutions, and dyeing animal fibers violet-brown to voilet to blue to black tints.

9. Mixed chromiferous azo-dyestuffs obtained by causing chromiferous azo-dyestuffs to react in the presence of caustic alkalies with such ortho-hydroxyazo-dyestuffs which are different from the ortho-hydroxyazo-dyestuffs used for producing the parent chromiferous ortho-hydroxyazo-dyestuffs, the mixture entering the reaction containing at least one ortho-hydroxyazo-dyestuff which is obtained by coupling diazotized ortho-hydroxyaminonaphthalene sulfonic acids with hydroxynaphthalenes, which products represent dark powders, dissolving in water to violet to blue to black solutions, and dyeing animal fibers violet-brown to violet to blue to black tints.

10. The mixed chromiferous azo-dyestuff obtained by causing the chromiferous ortho-hydroxyazo-dyestuff from the ortho-hydroxyazo-dyestuff of the formula

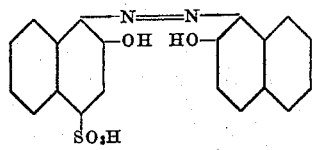

to react in presence of caustic alkalies with the ortho-hydroxyazo-dyestuff of the formula

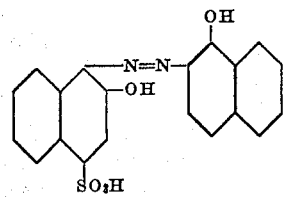

which product represents a violet-black powder dissolving in water to a blue solution and dyeing animal fibers navy blue tints.

FRITZ STRAUB.
HERMANN SCHNEIDER.